(12) United States Patent
Bonalumi et al.

(10) Patent No.: US 11,198,806 B2
(45) Date of Patent: Dec. 14, 2021

(54) $CO_2$-BASED MIXTURES AS WORKING FLUID IN THERMODYNAMIC CYCLES

(71) Applicant: POLITECNICO DI MILANO, Milan (IT)

(72) Inventors: Davide Bonalumi, Milan (IT); Ennio Macchi, Milan (IT); Silvia Lasala, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/646,448

(22) PCT Filed: Sep. 4, 2018

(86) PCT No.: PCT/IB2018/056719
§ 371 (c)(1),
(2) Date: Mar. 11, 2020

(87) PCT Pub. No.: WO2019/053550
PCT Pub. Date: Mar. 21, 2019

(65) Prior Publication Data
US 2020/0270496 A1 Aug. 27, 2020

(30) Foreign Application Priority Data

Sep. 12, 2017 (IT) .................. 102017000102023
Nov. 24, 2017 (IT) .................. 102017000135115

(51) Int. Cl.
*C09K 5/04* (2006.01)
*F01K 25/10* (2006.01)

(52) U.S. Cl.
CPC ............ *C09K 5/048* (2013.01); *F01K 25/103* (2013.01)

(58) Field of Classification Search
CPC .......... C09K 5/04; C09K 5/041; C09K 5/047; C09K 5/048; C09K 2205/106;
(Continued)

(56) References Cited

U.S. PATENT DOCUMENTS 3,713,289 A * 1/1973 Somekh .................. F01K 25/08
252/67
3,845,628 A * 11/1974 Bronicki ................ F01K 25/06
165/104.21
(Continued)

FOREIGN PATENT DOCUMENTS

| CN | 103937459 B | 3/2017 | |
|---|---|---|---|
| JP | 60096892 A * | 5/1985 | .......... F28D 20/003 |
| WO | 2007033958 A1 | 3/2007 | |

OTHER PUBLICATIONS

Tolley et al. ("Titanium tetrachloride-supercritical carbon dioxide interaction: a solvent extraction and thermodynamic study," Metallurgical Transactions B, vol. 23B, pp. 65-72) (Year: 1992).*
(Continued)

*Primary Examiner* — Matthew R Diaz
(74) *Attorney, Agent, or Firm* — Armstrong Teasdale LLP

(57) ABSTRACT

Described herein is a working fluid for a thermodynamic cycle that includes $CO_2$ as main component and one or more of the compounds selected from the group including: $TiCl_4$, $TiBr_4$, $SnCl_4$, $SnBr_4$, $VCl_4$, $VBr_4$, $GeCl_4$, metal carbonyls, by way of example $Ni(CO)_4$.

5 Claims, 2 Drawing Sheets

(58) Field of Classification Search
CPC .......... F01K 25/00; F01K 25/08; F01K 25/10; F01K 25/103; F01K 25/12; F28F 23/00; F24S 80/20; F03G 6/02
See application file for complete search history.

(56) References Cited

U.S. PATENT DOCUMENTS

| | | | | |
|---|---|---|---|---|
| 4,134,451 | A | * | 1/1979 | Conant .................. F28F 21/02 165/133 |
| 5,255,523 | A | * | 10/1993 | Burgers .................. F25B 1/00 62/384 |
| 5,783,104 | A | * | 7/1998 | Kujak .................... C09K 5/047 252/67 |
| 8,166,761 | B2 | * | 5/2012 | Moghtaderi ............ F01K 25/10 60/651 |
| 8,281,861 | B2 | * | 10/2012 | Nguyen .................. E21B 44/02 165/45 |
| 2009/0107144 | A1 | | 4/2009 | Moghtaderi et al. |

OTHER PUBLICATIONS

English language machine translation of Yamazaki et al. (JP 60096892 A) (Year: 1985).*
Invernizzi et al. ("Supercritical and real gas Brayton cycles operating with mixtures of carbon dioxide and hydrocarbons" Proc IMechE Part A: J Power and Energy 226, 5, 682-693) (Year: 2012).*
Conboy et al. ("CO2-Based Mixtures as Working Fluids for Geothermal Turbines" Sandia Report, Sandia National Laboratories) (Year: 2012).*
Invernizzi et al. ("Titanium tetrachloride as novel working fluid for high temperature Rankine Cycles: Thermodynamic analysis and experimental assessment of the thermal stability" Applied Thermal Engineering 107, 2016, 21-27) (Year: 2016).*
International Search Report and Written Opinion for International Patent Application No. PCT/IB2018/056719, dated Jan. 4, 2019, 8 pages.
Tolley W K et al: "Titanium Tetrachloride-Supercritical Carbon Dioxide Interaction: A Solvent Extraction and Thermodynamic Study", Metallurgical Transactions B. Process Metallurgy, Metallurgical Society of Aime. New Work, US, vol. 23B, No. 1, Feb. 1, 1992 (Feb. 1, 1992), pp. 65-72, XP000270940.

* cited by examiner

Efficiency for 2.5 mol% with recovery system layout

Efficiency for 0 mol%, 2.5 mol%, 10 mol% with recompressed layout

CO$_2$-BASED MIXTURES AS WORKING FLUID IN THERMODYNAMIC CYCLES

CROSS-REFERENCE TO RELATED APPLICATIONS

This application is a National Phase filing of PCT International Application No. PCT/IB2018/056719 having an International Filing Date of Sep. 4, 2018, which claims the benefit of priority to Italian Patent Application No. 102017000102023, having a filing date of Sep. 12, 2017, and to Italian Patent Application No. 102017000135115, having a filing date of Nov. 24, 2017, each of which is hereby incorporated by reference in its entirety.

FIELD OF THE INVENTION

The invention relates to the field of electric energy and, possibly, thermal energy generation. A new mixture to be used as working fluid is described, which fluid comprises $CO_2$ as the major component, mixed with one or more of the compounds selected from $TiCl_4$, $TiBr_4$, $SnCl_4$, $SnBr_4$, $VCl_4$, $VBr_4$, $GeCl_4$, metal carbonyls, by way of example $Ni(CO)_4$. The mixture suggested here as a working fluid allows a greater thermodynamic cycle efficiency with respect to that which can be obtained with the use of $CO_2$ alone.

BACKGROUND

Water is the preeminent working fluid used in closed cycles thermodynamic, in particular in the Rankine Cycle.

The thermodynamic conversion of heat from non-traditional sources (geothermal energy, biomass energy, solar thermal energy, energy recovered from industrial processes) displays a great variety of interested powers, as well as different heat sources (liquid, gas, mixtures of gases and vapors), making the conventional steam and gas cycles inadequate. For this reason, an intense search is underway for working fluids alternative to water which allow the implementation of different and appropriate thermodynamic cycles, whereby guaranteeing the operating conditions for efficient conversion for any power size or temperature level.

Organic fluids are advantageously used in thermal recovery from industrial processes. For example, WO2007033958 describes perfluorocarbons and/or polyethers perfluorates and/or ketones perfluorates as working fluids for thermodynamic cycles. Said organic fluids are used at maximum temperatures up to 400° C. The limited thermal stability of organic fluids makes use at temperatures higher than 350-400° C. impossible.

$CO_2$ has been experimentally tested with the objective of operating in thermodynamic cycles at temperatures equal to or higher than 400° C. $CO_2$ has a critical temperature of about 31° C. and a corresponding critical pressure of about 73 bar. These properties imply the cycles known as Joule-Brayton cycles as the main use of such fluid. Typically, by adopting a compressor to increase the pressure of the fluid itself, which is in the gaseous phase, they make its use for cycles at limited maximum temperatures energetically unfavorable.

$CO_2$-based mixtures have been suggested with the objective of allowing use in Rankine cycles, but these have proven to be of little use, because of their thermal instability. For example, CN103937459B describes a mixture based on $CO_2$ which also includes either propane, cyclopropane, propene, butane, iso-butane, cis-butene, trans-butene or cyclopentane. The critical temperature is improved (raised) but the additional components have poor thermal stability, whereby making the mixture not applicable to thermodynamic cycles which reach temperatures of 400° C. and beyond.

$CO_2$ and benzene mixtures have also been suggested, with more favorable critical temperatures and with a high thermal stability but with disadvantages linked to the carcinogenicity of benzene.

$TiCl_4$ is an important intermediate in the production of metallic titanium and $TiO_2$, which is liquid at ambient temperature. Typically, $TiCl_4$ is isolated from mixtures which comprise it by means of distillation. Tolley W K et al. (Metallurgical Transactions B, Titanium tetrachloride-supercritical carbon dioxide interaction: A solvent extraction and thermodynamic study, 1992, Volume (1):65-72) alternatively suggest the removal of $TiCl_4$ from $AlCl_3$ mixtures with supercritical $CO_2$.

The need for new working fluids, which are liquid at ambient temperature and have high thermal stability, is strongly felt.

SUMMARY OF THE INVENTION

The present invention relates to a mixture which comprises $CO_2$ as main component and one or more of the compounds selected from the group which comprises: $TiCl_4$, $TiBr_4$, $SnCl_4$, $SnBr_4$, $VCl_4$, $VBr_4$, $GeCl_4$, metal carbonyls, by way of example $Ni(CO)_4$.

DETAILED DESCRIPTION OF THE INVENTION

Figure 1:
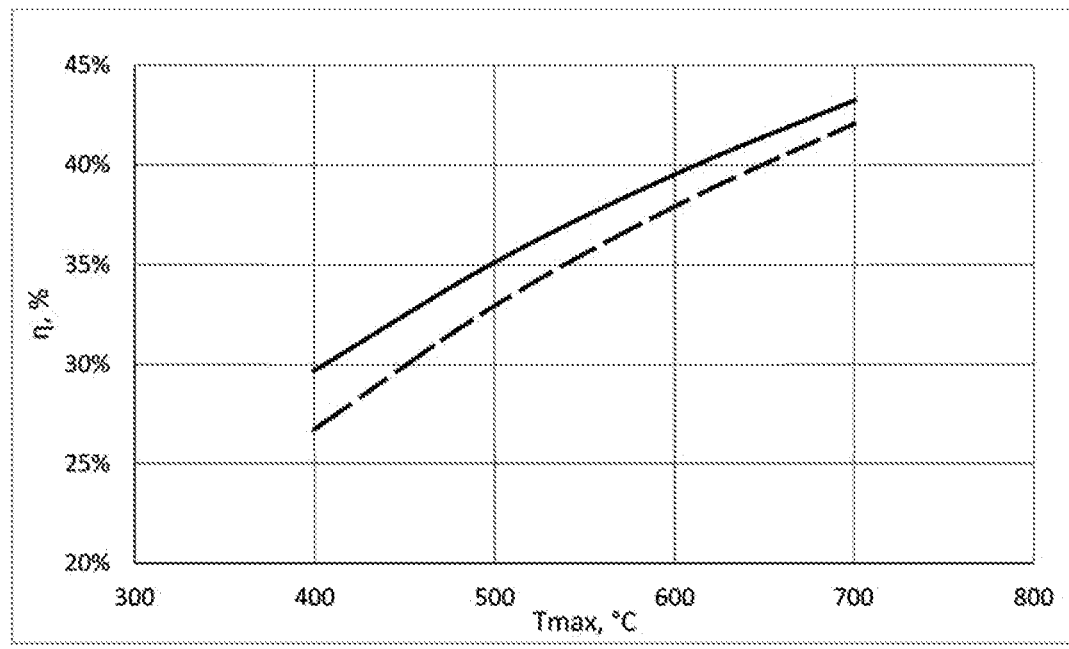
FIG. 1: Efficiency of a thermodynamic cycle at temperatures between 400 and 700° C. using as working fluid either $CO_2$ (dashed line) or a mixture which comprises $CO_2$ and $TiCl_4$ 2.5 mol % (solid line).

The mixture which is the object of the present invention comprises $CO_2$ as main component and one or more of the compounds selected from the group which comprises: $TiCl_4$, $TiBr_4$, $SnCl_4$, $SnBr_4$, $VCl_4$, $VBr_4$, $GeCl_4$, metal carbonyls, by way of example $Ni(CO)_4$.

In a preferred embodiment, said mixture comprises $CO_2$ and one of the compounds selected from the group which comprises: $TiCl_4$, $TiBr_4$, $SnCl_4$, $SnBr_4$, $VCl_4$, $VBr_4$, $GeCl_4$, metal carbonyls, by way of example $Ni(CO)_4$.

In a further embodiment, said mixture comprises $CO_2$ and one of the compounds selected from the group which comprises: $TiCl_4$, $TiBr_4$, $SnCl_4$, $SnBr_4$, $VCl_4$, $VBr_4$, $GeCl_4$.

Said additional compound is present in the mixture of $CO_2$ with a concentration comprised between 1 and 30 mol %, or between 2 and 20 mol %, or between 2.5 and 10 mol %.

In a preferred embodiment, the mixture according to the present invention consists in $CO_2$ and one of the compounds selected from the group which comprises: $TiCl_4$, $TiBr_4$, $SnCl_4$, $SnBr_4$, $VCl_4$, $VBr_4$, wherein said additional compound is present at a concentration comprised between 1 and 30 mol %, or between 2 and 20 mol %, or between 2.5 and 10 mol %.

Said additional compound is added to the mixture according to the present invention as a pure compound in 98%, or 99%, or 99.5% by weight. In a preferred embodiment, the compound is added with a purity of 99.9% by weight, preferably 99.99%, even more preferably 99.9999%. The high degree of purity guarantees the absence of impurities which may have a low thermal stability and cause, at high processing temperatures, undesired and even violent reactions, such as for example explosions.

In a particularly preferred embodiment, said additional compound is $TiCl_4$.

$TiCl_4$, $TiBr_4$, $SnCl_4$, $SnBr_4$, $VCl_4$, $VBr_4$ can be mixed with the liquid $CO_2$ and surprisingly elevate its critical temperature, leading to a surprising advantage in terms of efficiency when the mixtures according to the present invention are employed in thermodynamic cycles which operate at temperatures equal to higher than 400° C.

The mixture according to the present invention has the surprising advantage of significantly modifying the critical temperature of the $CO_2$, whereby obtaining a fluid which is liquid up to 40° C., or up to 50° C., i.e. higher than 31° C. Furthermore, the mixture obtained is thermodynamically stable and is able to withstand operating temperatures of 400° C. and higher without significant alterations and without originating undesired degradation products, increasing operational efficiency of thermodynamic cycles in which it is used as working fluid in replacement of $CO_2$ as such.

The advantage in terms of operational efficiency recovery in thermodynamic cycles has been found to be particularly significant with mixtures which comprise concentrations higher than 2 mol % of compound. The advantage tends to be imperceptible to concentrations close to 40-50 mol % of compound. For each concentration, as the temperature increases, in particular at temperatures higher than 700° C., we have hereby demonstrated that the difference in efficiency between a thermodynamic cycle operating with pure $CO_2$ and a thermodynamic cycle operating with a mixture according to the present invention tends to be lower, while maintaining a non-insignificant advantage for the mixture.

By way of example, FIG. 1 shows the performance of a thermodynamic cycle operating with a mixture of $CO_2$ and $TiCl_4$ 2.5 mol % (solid line) and the performance of the same operating cycle with pure $CO_2$ (dashed line). The mixture shows higher performance at all temperatures, at 400° C. the performance increase is greater than the increase observed at higher temperatures.

An increase in the concentration of the compound leads to better performance, but increments are greater at low molar concentrations (2-5%). An excessive increase of the concentration of the compound causes slightly better performance, with the disadvantage of operating with a greater amount of substance which is less easy to manage than $CO_2$.

Figure 2:
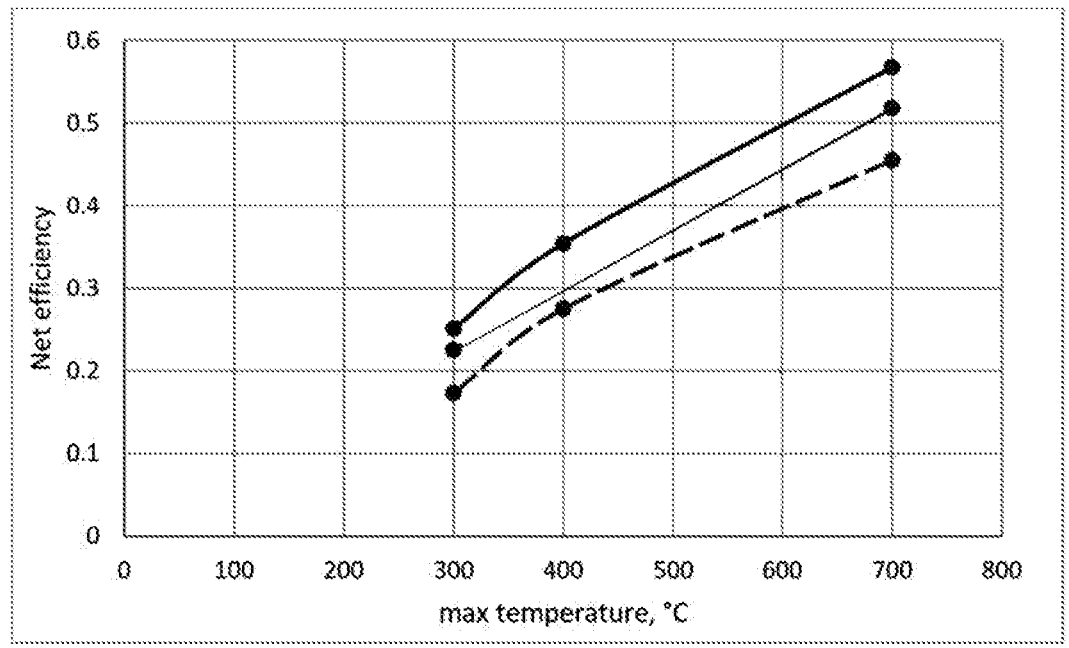
FIG. 2: Efficiency of a thermodynamic cycle at temperatures between 300 and 700° C. using as working fluid either $CO_2$ (dashed line) or a mixture which comprises $CO_2$ and $TiCl_4$ 2.5 mol % (solid line), or $CO_2$ and $TiCl_4$ 10 mol % (solid bold line).

By way of example, FIG. 2 shows an example of comparison between the performance of a thermodynamic cycle operating with a mixture of $CO_2$ and $TiCl_4$ 10 mol % (solid bold line), with a mixture of $CO_2$ and $TiCl_4$ 2.5 mol % (solid line) and with pure $CO_2$ (dashed line). It may be noted from the comparison between the solid bold line and the solid line, that the increase in performance is less evident as the concentration of $TiCl_4$ in the mixture increases.

It is particularly interesting to observe that the advantages in terms of efficiency were observed at relatively low compound concentrations, between 2 and 5 mol %. This is particularly significant because it allows the use of $CO_2$ mixtures with minimal additions of one of the indicated compounds. The toxicity, although limited, of the added compounds in the $CO_2$ mixture and their cost compared to the cost of $CO_2$ have very limited impact because of the small volumes used.

The performance of the thermodynamic cycles to which reference is made in the examples were evaluated by calculating the thermodynamic properties of the mixture. Cubic Peng-Robinson was used as thermodynamic equation; the equation parameters were inferred from experimental data.

The mixture according to the present invention is prepared according to methods known to a person skilled in the art. By way of example, the amount of one or more of the compounds to be added to the $CO_2$ is introduced in an anhydrous tank and flushed with an inert gas, such as $N_2$ or He. Said tank is connected to a $CO_2$ bottle, at a pressure higher than the final pressure of the tank, whereby obtaining the desired mixture.

The mixture according to the present invention is validly applied as working fluid in systems for the generating electric and possibly even thermal energy. It is also an alternative to fluids commonly used in ORC systems and in refrigeration systems.

By way of example, it may be used in electric and thermal energy generation and distribution, in organic fluid Organic Rankine Cycle engines (ORC), in co-generative engines and in refrigeration systems.

The mixture according to the present invention is advantageously used in geothermal heat systems, solar heat systems, in particular solar towers, in waste incinerators or biomass systems. Advantageously, the mixture according to the present invention is used in aerospace applications.

Figure 3:
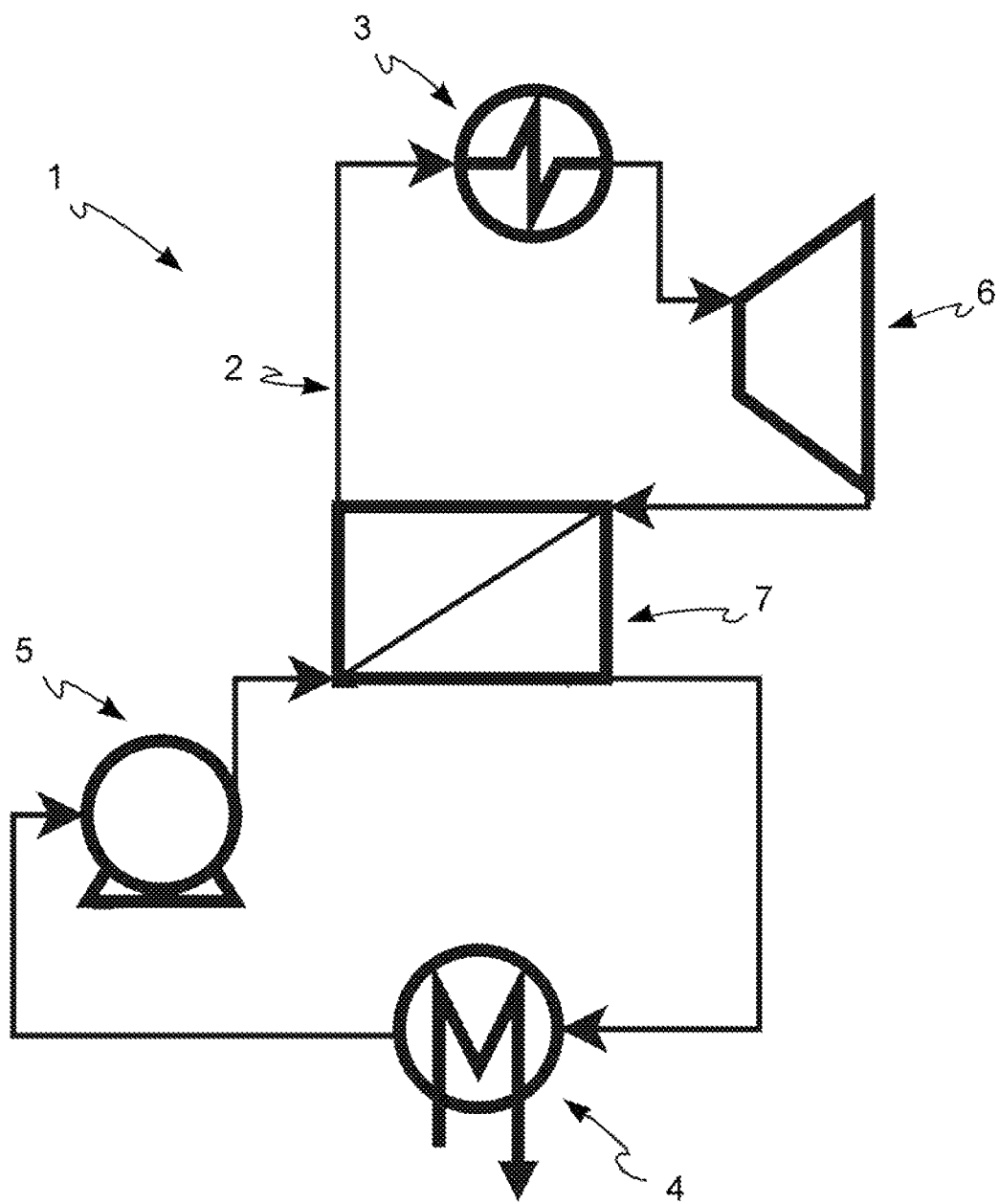
FIG. 3: Diagram of a regenerative system which uses a mixture according to the present invention as a working fluid.

FIG. 3 diagrammatically shows, by way of example, a regenerative system operated with the mixture according to the present invention. The system (1) comprises a circuit (2) in which the mixture according to the present invention circulates. Said circuit (2) comprises two exchange points with the outside environment, a heat exchanger (3) which acquires heat from the outside and a condenser (4) which exchanges heat with the environment to obtain saturated liquid. Said mixture is circulated in said circuit (2) by a pump (5). Since said mixture is in liquid state, the circuit is operated by a pump and not by a compressor, which requires higher energy costs for operation. Having acquired heat from the heat exchanger, the mixture actuates a turbine (6) which generates the energy after its crosses a recuperator (7). The passage in the recuperator (7) exchanges heat between the mixture exiting from the turbine and the mixture entering into the primary heat exchanger, whereby allowing a recovery of the remaining heat, as well as a lowering of the temperature of the mixture before it enters into the condenser. From the recuperator, the mixture flows into the condenser (4), in which it condenses and resumes the cycle.

Advantageously, the solution suggested in the present invention, by replacing the $CO_2$ with a mixture having a critical temperature greater than the $CO_2$, makes it possible to have the same mixture in liquid phase also at temperatures higher than the critical value of $CO_2$, wherein said mixture is in a liquid phase even at temperatures of 50° C., or 40° C. The mixture according to the present invention, makes it possible to have a working fluid in liquid phase, whereby permitting the adoption of the Rankine cycle, in which the compression phase occurs advantageously by using a pump and not a compressor.

$TiCl_4$ is particularly advantageous since it is an intermediate synthesis product. The product is therefore available at an affordable price.

What is claimed is:

1. A process for converting thermal energy into mechanical and/or electric energy, the process including employing a working fluid that comprises $CO_2$ as a main component and one or more of the compounds selected from the group consisting of $TiCl_4$, $TiBr_4$, $VCl_4$, $VBr_4$, $GeCl_4$, and metal carbonyls, wherein the one or more compounds have a concentration between 1 and 30 mol % in the working fluid.

2. The process for converting thermal energy according to claim 1, wherein the thermal energy is thermal energy of fossil, biomass, solar, geothermal, and/or process heat origin.

3. The process of claim 1, wherein the metal carbonyl is $Ni(CO)_4$.

4. A system for operating a conversion process from thermal energy to mechanical and/or electric energy, wherein a working fluid that comprises $CO_2$ as a main component and one or more of the compounds selected from the group consisting of $TiCl_4$, $TiBr_4$, $SnCl_4$, $SnBr_4$, $VCl_4$, $VBr_4$, $GeCl_4$, and metal carbonyls is employed, wherein the one or more compounds have a concentration between 1 and 30 mol % in the working fluid.

5. The system according to claim 4, wherein the thermal energy is obtained from solar towers.

\* \* \* \* \*